United States Patent
Diallo (10) Patent No.: US 11,415,719 B2
(45) Date of Patent: Aug. 16, 2022

(54) METHOD OF APPLICATION OF POLARIZATION FILTERING ON SINGLE COMPONENT SEISMIC DATA FOR INTERFACE WAVE NOISE ATTENUATION

(71) Applicant: Saudi Arabian Oil Company, Dhahran (SA)

(72) Inventor: Mamadou Sanou Diallo, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 259 days.

(21) Appl. No.: 16/788,800

(22) Filed: Feb. 12, 2020

(65) Prior Publication Data

US 2021/0247536 A1 Aug. 12, 2021

(51) Int. Cl.
*G01V 1/36* (2006.01)

(52) U.S. Cl.
CPC ...... *G01V 1/364* (2013.01); *G01V 2210/3246* (2013.01)

(58) Field of Classification Search
CPC .. G01V 1/364; G01V 2210/3246; G01V 1/28; G01V 1/284
See application file for complete search history.

(56) References Cited

U.S. PATENT DOCUMENTS

| | | | |
|---|---|---|---|
| 4,757,480 A | 7/1988 | Gutowski | |
| 6,021,379 A | 2/2000 | Duren et al. | |
| 6,519,205 B1 | 2/2003 | Baeten et al. | |
| 7,181,347 B2 | 2/2007 | Moore | |
| 7,239,578 B2 | 7/2007 | Robinson | |
| 7,539,578 B2 | 5/2009 | Saenger | |
| 7,554,883 B2 | 6/2009 | Barnes | |
| 7,590,491 B2 | 9/2009 | Saenger | |

(Continued)

FOREIGN PATENT DOCUMENTS

| | | |
|---|---|---|
| CN | 101915939 A | 12/2010 |
| CN | 101915939 B * | 7/2012 |

(Continued)

OTHER PUBLICATIONS

Alyousuf Tagi Yousuf "Advances in Surface-Waves Analysis Using Single Sensor Seismic Data and Deep Neural Network Algorithm for Near Surface Characterization". (Year: 2019).*

(Continued)

*Primary Examiner* — Catherine T. Rastovski
*Assistant Examiner* — Kaleria Knox
(74) *Attorney, Agent, or Firm* — Bracewell LLP; Constance G. Rhebergen; Brian H. Tompkins (57) ABSTRACT

Systems, methods, and computer-readable media for the attenuation of interface waves using polarization filtering applied to recorded single component seismic data are disclosed. A second component for polarization filtering is created by determining interface waves from the recorded data single component seismic data. The second component seismic data may be generated using an interface waves propagation model (in frequency or time-frequency domain) or by differential normal move-out (NMO) interpolation.

(Continued)

Polarization filtering may be applied to multicomponent seismic data formed from the recorded single component seismic data and the generated second component seismic data to attenuate interface noise.

20 Claims, 6 Drawing Sheets

(56) References Cited

U.S. PATENT DOCUMENTS

| | | | |
|---|---|---|---|
| 7,725,265 B2 | 5/2010 | Saenger | |
| 8,352,192 B2 | 1/2013 | Diallo et al. | |
| 8,451,684 B2 | 5/2013 | Lee et al. | |
| 8,553,497 B2 | 10/2013 | Krohn | |
| 8,712,694 B2 | 4/2014 | Edme et al. | |
| 8,838,392 B2 | 9/2014 | Halliday et al. | |
| 8,892,410 B2 | 11/2014 | Krohn | |
| 9,110,187 B2 | 8/2015 | Muyzert et al. | |
| 9,304,221 B2 | 4/2016 | Edme et al. | |
| 9,594,174 B2 | 3/2017 | Goujon et al. | |
| 9,829,590 B2 | 11/2017 | Hardage | |
| 9,891,331 B2 | 2/2018 | Hornbostel et al. | |
| 10,048,395 B2 | 8/2018 | Goujon et al. | |
| 10,145,974 B2 | 12/2018 | Hornbostel et al. | |
| 10,295,687 B2 | 5/2019 | Bloor et al. | |
| 2011/0004409 A1* | 1/2011 | Diallo | G01V 1/284 |
| | | | 702/17 |
| 2014/0160887 A1 | 6/2014 | Robertsson | |
| 2015/0362608 A1 | 12/2015 | Van Groenestijn | |
| 2016/0320506 A1 | 11/2016 | Almuhaidib | |
| 2017/0248716 A1* | 8/2017 | Poole | G01V 1/28 |

FOREIGN PATENT DOCUMENTS

| | | |
|---|---|---|
| WO | 2008005775 A2 | 1/2008 |
| WO | 2016155771 A1 | 10/2016 |

OTHER PUBLICATIONS

"Wavelet Analysis of Ellipticity, Dispersion, and Dissipation Properties of Rayleigh Waves" M. A. Kulesh, M. S. Diallo, and M. Holschneider vol. 51, No. 4, 2005, pp. 425-434 (Year: 2004).*

"Instantaneous polarization attributes based on an adaptive approximate covariance method" Mamadou Sanou Diallo, Michail Kulesh2, Matthias Holschneider, Kristina Kurennaya, and Frank Scherbaum;Geophysics,vol. 71, No. 5 Sep.-Oct. 2006; p. V99-V104, 6 FIGS. (Year: 2006).*

Alyousuf, Taqi Yousuf et al.; "Advances in Surface-Wave Analysis Using Single Sensor Seismic Data and Deep Neural Network Algorithm for Near Surface Characterization" SPE-197536-MS, Int'l Petroleum Exhibition & Conf., Abu Dhabi, Nov. 11-14, 2019; pp. 1-9.

International Search Report and Written Opinion for International Application No. PCT/US2021/017968, dated May 26, 2021; pp. 1-15.

Diallo, M.S. et al.; "Characterization of Dispersive Rayleigh wave using Wavelet Transforms" American Geophysical Union (AGU) meeting, San Francisco, Dec. 8-12, 2003; p. 1.

Holschneider, M. et al.; "Characterization of dispersive surface waves using continuous wavelet transforms" Geophys. J. Int. (2005) 163, pp. 463-478.

Kulesh, M. et al.; "Geophysical wavelet library: Applications of the continuous wavelet transform to the polarization and dispersion analysis of signals" Computers & Geosciences 34 (2008); pp. 1732-1752.

Kulesh, M. et al.; "Modeling of Wave Dispersion Using Continuous Wavelet Transforms" Pure appl. geophys 162 (2005) pp. 843-855.

Van Dedem, Ewoud Jan; "3D surface-related multiple prediction" Ph.D Thesis submission, Delft University of Technology, 2002; pp. 1-223.

* cited by examiner

METHOD OF APPLICATION OF POLARIZATION FILTERING ON SINGLE COMPONENT SEISMIC DATA FOR INTERFACE WAVE NOISE ATTENUATION

BACKGROUND

Field of the Disclosure

The present disclosure generally relates to geophysical exploration using seismic surveying. More specifically, embodiments of the disclosure relate to the attenuation of noise from interface waves.

Description of the Related Art

In geophysical exploration, such as the exploration for hydrocarbons, seismic surveys are performed to produce images of the various rock formations in the earth ("subsurface") or underwater ("subsea"). The seismic surveys obtain seismic data indicating the response of the rock formations to the travel of elastic wave seismic energy. Various types of seismic waves may be generated as the seismic data, and such seismic waves include interface waves produced at the interface between different waves. These interface waves include Rayleigh waves and Scholte waves. Various techniques may be used to filter these interface waves from the seismic data. However, existing filtering techniques have specific spatial sampling requirements and depend on the availability of multicomponent seismic data.

SUMMARY

Interface waves (i.e., Rayleigh/Scholte waves) differ from body waves in many characteristics. For example, in heterogeneous media, interface waves' velocities are dispersive and are generally slower than those of body waves. One characteristic that enables the separation of interface waves from body waves is the polarization nature of particle motions. For interface waves, the particles' motion exhibits elliptic polarization, while for body waves the particles' motions exhibits a generally linear polarization. The polarization characteristics of different wave types in multicomponent data may be characterized by the ellipticity ratio, tilt and azimuth angle attributes.

Polarization filtering is typically used to filter interface waves such as Rayleigh waves (in land environments) and Scholte waves (in marine environments) from multicomponent seismic data. However, the application of polarization filtering requires the availability of multicomponent data— that is, at least two-component data for each seismic receiver. This requirement results in specific receiver spacing constraints to avoid spatial aliasing of interface waves needed for the application of existing multichannel filtering techniques. Additionally, the multicomponent data requirement may limit the application of such filtering for land seismic data, as such data is typically acquired as single component data (that is, P-wave component data). Further, some multichannel filtering techniques, such as those based on frequent wave number (FK), may negatively impact the preservation of relative amplitudes of reflection signals used for Amplitude Versus Offset (AVO) analysis and inversion.

In one embodiment, a computer-implemented method for producing attenuated seismic data from single component seismic data generated from a seismic receiver station configured to sense seismic signals originating from a seismic source station is provided. The method includes obtaining single component seismic data from the seismic receiver station at a first location, filtering the single component seismic data to identify interface waves in the single component seismic data, and generating, using the identified interface waves, second component seismic data at a second location. The method further includes applying polarization filtering to multicomponent seismic data having the single component seismic data and the second component seismic data and producing attenuated seismic data from the application of polarization filtering, the attenuated seismic data having attenuated interface waves as compared to the single component seismic data.

In some embodiments, the method includes generating a seismic image from the attenuated seismic data. In some embodiments, the filtering is performed within a velocity constraint defined by a first velocity and a second velocity. In some embodiments, generating, using the identified interface waves, second component seismic data at a second location, includes using a differential normal moveout (NMO) interpolation applied to common midpoint (CMP) gathers of the identified interface waves. In some embodiments, generating, using the identified interface waves, second component seismic data at a second location, includes determining a dispersion curve using the identified interface waves and generating a second component seismic data at the second location using the frequency dependent velocity variation, the frequency dependent velocity variation determined from the dispersion curve. In some embodiments, the seismic receiver station is a geophone. In some embodiments, the second location is determined by adding a distance to the first location.

In another embodiment, a non-transitory computer-readable storage medium having executable code stored thereon for producing attenuated seismic data from single component seismic data generated from a seismic receiver station configured to sense seismic signals originating from a seismic source station is provided. The executable code includes a set of instructions that causes a processor to perform operations that include obtaining single component seismic data from the seismic receiver station at a first location, filtering the single component seismic data to identify interface waves in the single component seismic data, and generating, using the identified interface waves, second component seismic data at a second location. The operations further include applying polarization filtering to multicomponent seismic data having the single component seismic data and the second component seismic data and producing attenuated seismic data from the application of polarization filtering, the attenuated seismic data having attenuated interface waves as compared to the single component seismic data.

In some embodiments, the operations include generating a seismic image from the attenuated seismic data. In some embodiments, the filtering is performed within a velocity constraint defined by a first velocity and a second velocity. In some embodiments, generating, using the identified interface waves, second component seismic data at a second location, includes using a differential normal moveout (NMO) interpolation applied to common midpoint (CMP) gathers of the identified interface waves. In some embodiments, generating, using the identified interface waves, second component seismic data at a second location, includes determining a dispersion curve using the identified interface waves and generating a second component seismic data at the second location using the frequency dependent velocity variation, the frequency dependent velocity variation determined from the dispersion curve. In some embodiments, the seismic receiver station is a geophone. In some embodiments, the second location is determined by adding a distance to the first location.

In another embodiment, a system is provided. The system includes a seismic source station, a seismic receiver station configured to sense seismic signals originating from a seismic source station, a seismic data processor, and non-transitory computer-readable storage memory accessible by the seismic data processor and having executable code stored thereon for producing attenuated seismic data from seismic data generated from the seismic receiver station. The executable code includes a set of instructions that causes a processor to perform operations that include obtaining single component seismic data from the seismic receiver station at a first location, filtering the single component seismic data to identify interface waves in the single component seismic data, and generating, using the identified interface waves, second component seismic data at a second location. The operations further include applying polarization filtering to multicomponent seismic data having the single component seismic data and the second component seismic data and producing attenuated seismic data from the application of polarization filtering, the attenuated seismic data having attenuated interface waves as compared to the single component seismic data.

In some embodiments, the operations include generating a seismic image from the attenuated seismic data. In some embodiments, the filtering is performed within a velocity constraint defined by a first velocity and a second velocity. In some embodiments, generating, using the identified interface waves, second component seismic data at a second location, includes using a differential normal moveout (NMO) interpolation applied to common midpoint (CMP) gathers of the identified interface waves. In some embodiments, generating, using the identified interface waves, second component seismic data at a second location, includes determining a dispersion curve using the identified interface waves and generating a second component seismic data at the second location using the frequency dependent velocity variation, the frequency dependent velocity variation determined from the dispersion curve. In some embodiments, the seismic receiver station is a geophone. In some embodiments, the second location is determined by adding a distance to the first location.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure include systems, methods, and computer-readable media for the attenuation of interface waves (that is, Rayleigh waves or Scholte waves) using polarization filtering applied to single component seismic data. As described in the disclosure, the polarization filtering described in the disclosure uses single component seismic data (for example, P-wave components of a seismic wavefield). A second component for the polarization filtering is created by generating the interface waves from the recorded single component seismic data. As used herein, the term "recorded" seismic data refers to the seismic data (for example, seismic traces) recorded at one or more seismic receivers. The term "generated" seismic data refers to seismic data generated from the recorded seismic data and not obtained directly from a seismic receiver.

As described in the disclosure, the generated second component seismic data may be generated using interface waves propagation characteristic (for example, using an interface waves propagation model in frequency or time-frequency domain) or by differential normal move-out (NMO). The generated second component seismic data provides interface wave seismic data at a surface location without an actual receiver at that location.

Advantageously, the attenuation of interface waves via the application of polarization filtering to single component seismic data may enable an increase in the spacing between seismic receivers. Consequently, the number of seismic receivers used for a given acquisition operation may be significantly reduced, thus reducing turnaround time and the cost of seismic data acquisition. As a result, seismic operations implementing embodiments of the disclosure may focus surveying efforts on optimizing parameters for signal acquisition (for example, recording relatively large signal to noise (SN) ratio data).

Figure 1:
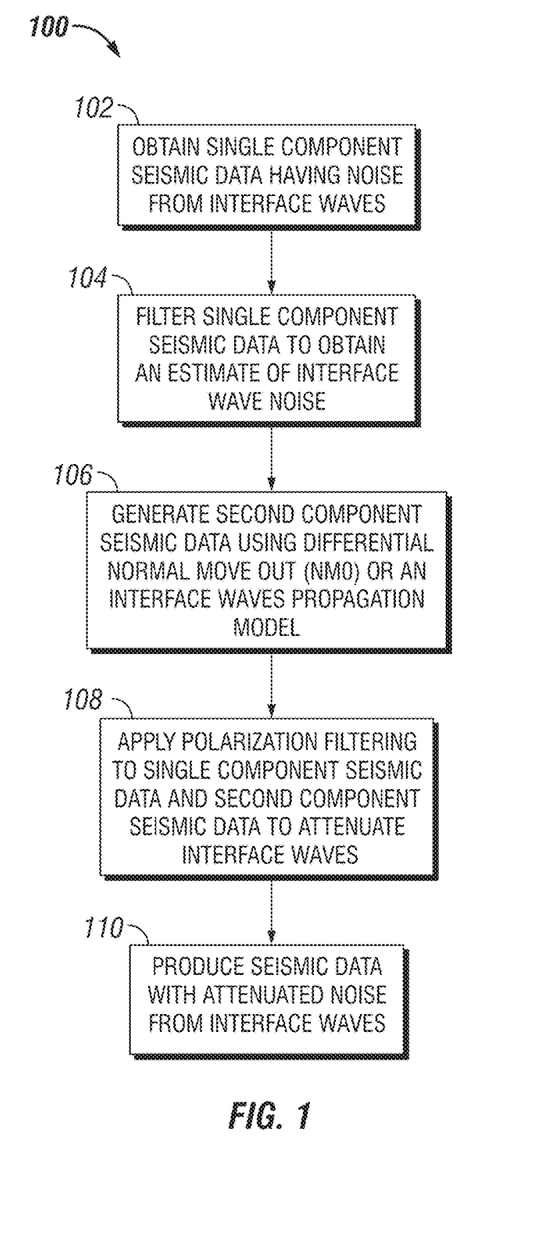
FIG. 1 is a block diagram of a process for attenuating interface waves using polarization filtering and single component seismic data in accordance with an embodiment of the disclosure.

FIG. 1 depicts a process 100 for attenuating interface waves using polarization filtering and single component seismic data in accordance with an embodiment of the disclosure. Initially, single component seismic data (for example, raw receiver gathers or traces) may be obtained (block 102), such as by recording the single component seismic data at a seismic receiver (also referred to as a "receiver station"). The single component seismic data may include noise from interface waves. The single component seismic data may be filtered to identify the interface waves in the data (block 104).

Next, second component seismic may be generated using differential normal move-out (NMO) or an interface waves propagation model (block 106). The recorded single component seismic data and the generated second component seismic data form multicomponent seismic data for subsequent attenuation of the interface wave noise via polarization filtering.

Polarization filtering may be applied to the multicomponent seismic data formed by the single component seismic data and the second component seismic data to attenuate the interface waves (block 108). Seismic data having attenuated noise from various sources, including interface waves, is produced (block 110). The attenuated seismic data may be used to generate a seismic image of a region of interest (for example, a subsurface rock formation).

Figure 2:
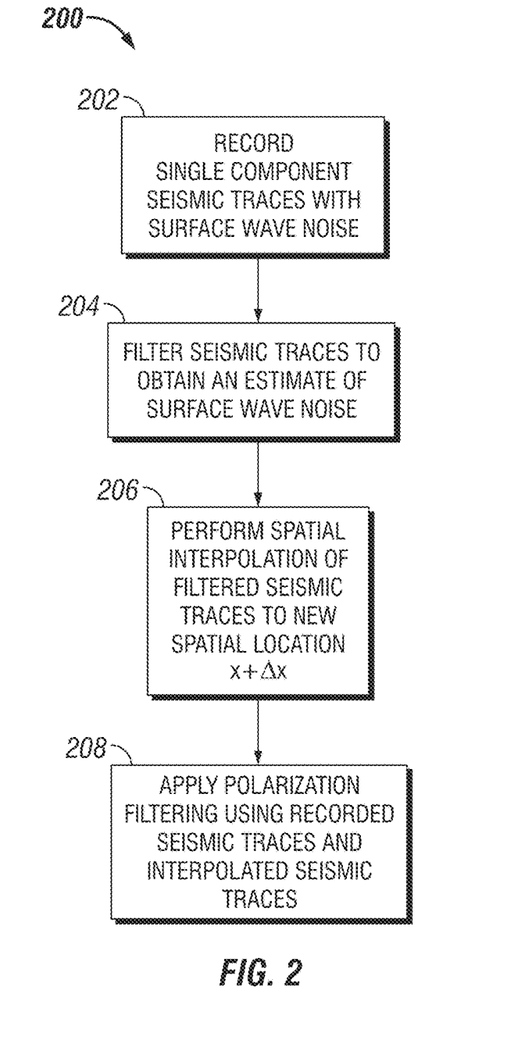
FIG. 2 is a block diagram of a process for filtering recorded single component seismic data and generating second component seismic data from the single component seismic data in accordance with an embodiment of the disclosure.

FIGS. 2-7 describe the filtering of single component seismic data and generating of second component seismic data in accordance with an embodiment of the disclosure. FIG. 2 depicts a process 200 for filtering single component seismic data and generating of second component seismic data in accordance with an embodiment of the disclosure. FIGS. 3-7 depict example seismic traces illustrating the process 200 in accordance with an embodiment of the disclosure.

Figure 3:
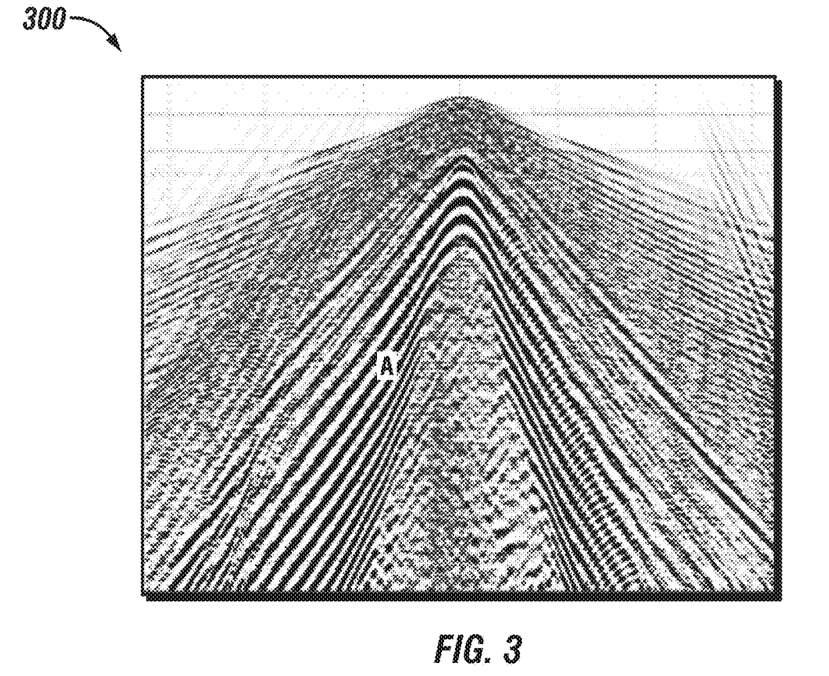
FIGS. 3-6 are example seismic receiver gathers illustrating the filtering of recorded single component seismic data and generation of second component seismic data in accordance with an embodiment of the disclosure.

As shown the process 200 in FIG. 2, single component seismic data (for example, raw receiver gathers or traces) with interface wave noise are recorded at one or more seismic receiver stations (block 202). FIG. 3 depicts an example recorded single component seismic trace 300 in accordance with an embodiment of the disclosure. Next, the single component seismic traces may be filtered to the frequency range of the interface waves to obtain an estimate of the interface wave noise (block 204). The frequency range for the filtering may be determined by a velocity constraint defined by a minimum apparent velocity (V1) and a maximum apparent velocity (V2) range.

Figure 4:
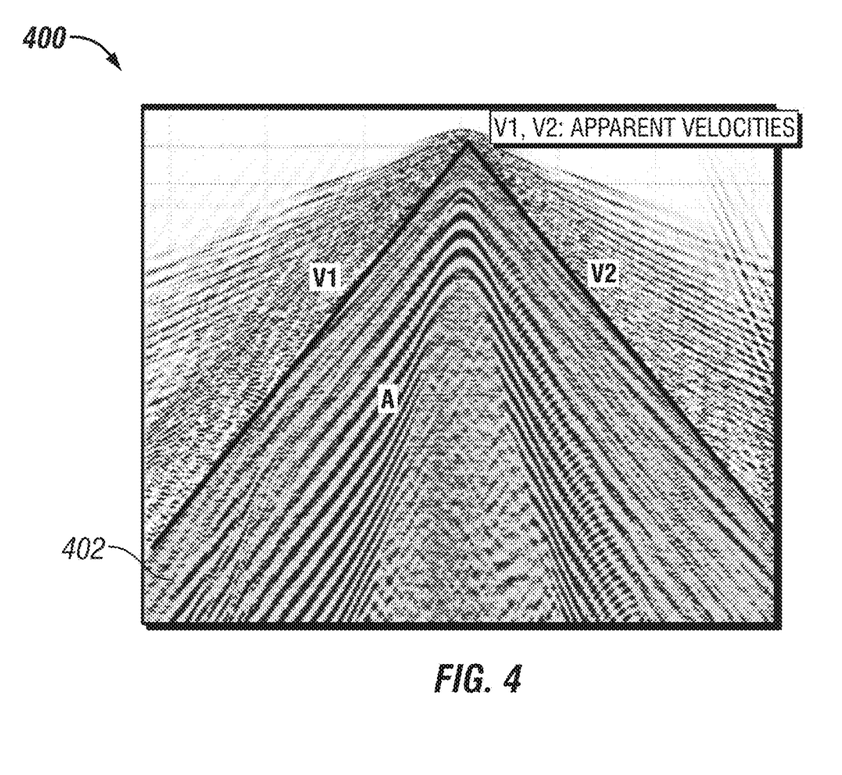
Figure 5:
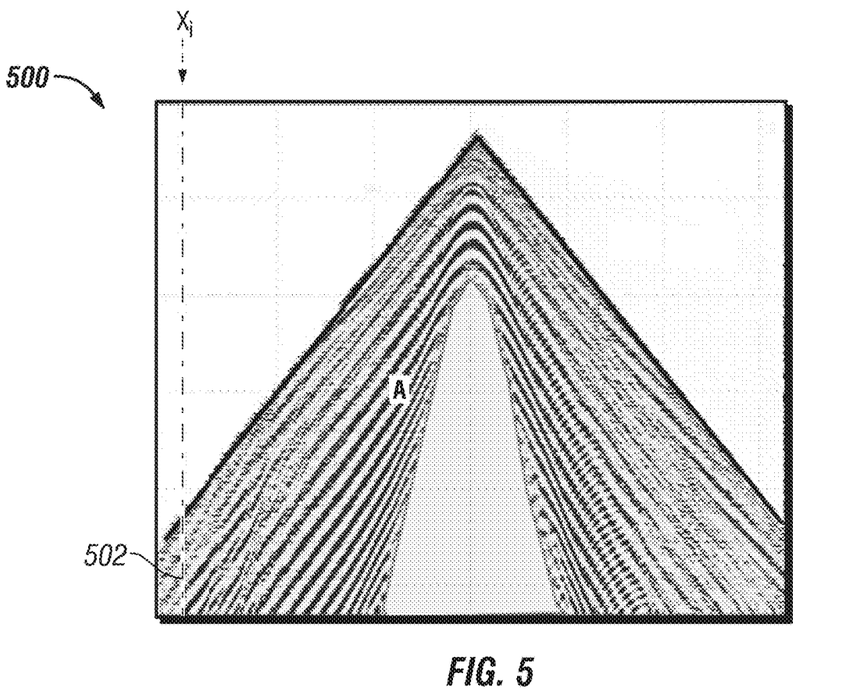

FIGS. 4 and 5 depicts the application of filtering to the frequency range of the interface waves as applied to the example seismic trace 300 of FIG. 3. FIG. 4 depicts a seismic trace 400 with the application of filtering for interface waves based on apparent velocities V1 and V2. As shown in FIG. 4, the domain of application of the filtering may be delimited by an area 402 as defined by a minimum apparent velocity (V1) and a maximum apparent velocity (V2). FIG. 5 depicts the interface wave noise 502 in a seismic trace 500 after the filtering of the seismic trace 400 depicted in FIG. 4.

Figure 6:
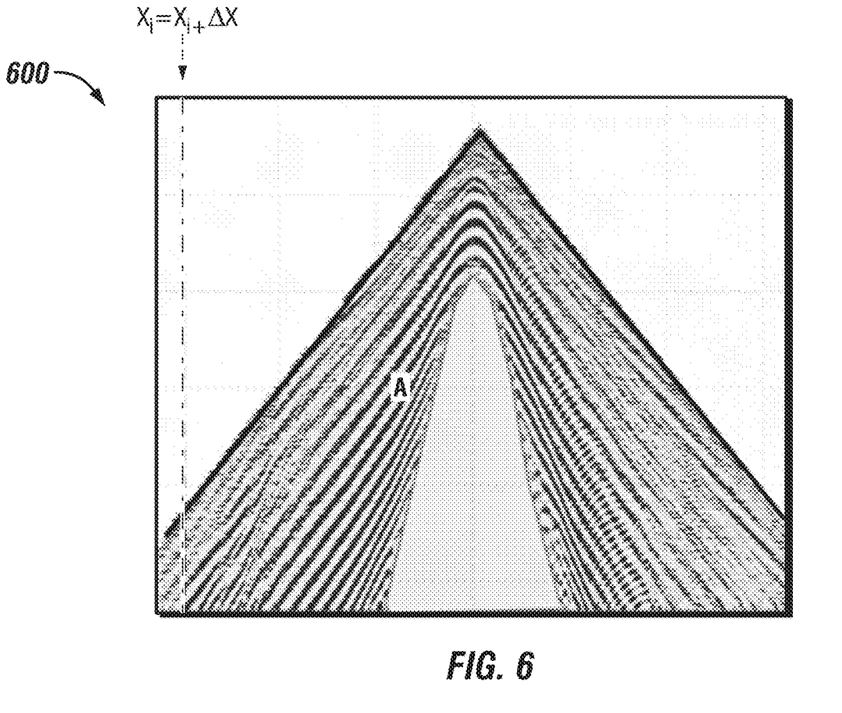

Next, the filtered seismic traces may be spatially interpolated to a new spatial location (block 206). By assuming an initial location of $x_i$, the new spatial location may be defined as $x+\Delta x$. For example, FIG. 5 depicts an initial location $x_i$ in the filtered seismic trace 500, and FIG. 6 depicts a new spatial location $x_i+\Delta x$ in accordance with an embodiment of the disclosure. The distance $\Delta x$ may be selected such that the effective time window that spans the interface wave arrivals in the recorded seismic data and the interface wave arrivals in the generated second component seismic data is the same. For example, in some embodiments, the distance $\Delta x$ should be less than 0.5 of the ratio of the lowest phase velocity of the interface waves over the highest frequency of the interface waves.

In some embodiments, the generation of the second component seismic data may be performed using differential NMO or a dispersion characteristic of the interface waves (that is, a dispersion curve) and an interface wave propagation model. As described in the disclosure, the generation of the second component seismic data using differential NMO or an interface wave propagation model results in a relatively small travel time shift or delay of the reflection events and produces an observable phase shift or delay from the interface waves of the recorded seismic data.

The differential NMO may be applied on common midpoint (CMP) gathers after attenuation of noise, such as from interface waves. As known in the art, the CMP location refers to the coordinate in between the source and receiver coordinates. Differential NMO is typically applied to reflection arrivals and may be used to perform trace interpolation for the application of surface related multiple elimination (SRME).

In the context of the attenuation of interface waves and the techniques of the disclosure, differential NMO may be applied to create a seismic trace dominated by interface wave arrivals at a surface location where no receiver station was present during the original acquisition of seismic data.

The input data to the differential NMO interpolation are CMP sorted gathers dominated by interface waves, not reflection arrivals. The differential NMO interpolation simulates a seismic trace at a surface station $x_i+\Delta x$ from an actual seismic trace recorded at a surface location $x_i$. As will be appreciated, interface wave velocities are significantly slower than body wave velocities. The application of differential NMO on CMP sorted gathers dominated by interface waves to simulate a trace at $x_i+\Delta x$ using a relatively small $\Delta x$ (that is, less than the actual distance between receiver stations used to record the original seismic trace) may generate a new seismic trace have a residual reflection event with a relatively small travel time shift $\Delta t$ (because of a relatively large propagation velocity) as compared to interface wave events. The differential NMO interpolation may be performed in terms of offsets (that is the offset h between source and receiver) to simulate a measurement at a particular offset. The travel time at offset $h+\Delta h$ may be expressed as a function of the travel time at offset $h(t_h)$, the offset h, the offset $h+\Delta h$, and the velocity v, as shown in Equation 1:

$$t_{h+\Delta h}(t_h, h, h+\Delta h, v) = \sqrt{t_h^2 + \frac{(h+\Delta h)^2 - h^2}{v^2}} \quad (1)$$

In which $t_h$ is defined according to Equation 2:

$$t_h(t_0, h, v) = \sqrt{t_0^2 + \frac{h^2}{v^2}} \quad (2)$$

where $t_0$ is in the travel time at zero offset.

Using Equation 1, the travel time in the measurement at offset $h+\Delta h$ that corresponds to the travel time $t_h$ in the measurement at offset h may be determined. The travel time mapping provides for the generation of seismic traces at specific offsets from the traces in the CMP gather.

The relatively large $\Delta t$ of the interface wave events in the extrapolated traces induces a phase shift in comparison to the associate surface wave events in the actual seismic trace and may be used to apply polarization filtering to the multicomponent seismic data made of the actual seismic trace and the extrapolated seismic trace. For the application of polarization filtering, the extrapolated seismic trace may be assumed to be at the same location as the actual seismic trace. The amplitude inaccuracy in the extrapolated trace does not affect the application of polarization filtering and attenuation of interface wave noise. As will be appreciated, the purpose of the extrapolation is to create a seismic trace with a slightly phase shifted interface arrival and with an amplitude of the same order of magnitude as the actual recorded trace.

As noted supra, FIG. 6 illustrates the spatial interpolation of the seismic trace 500 using differential NMO to produce a second component seismic trace 600 at new spatial location $x_i+\Delta x$ in accordance with an embodiment of the disclosure.

In other embodiments, the generation of the second seismic trace may be performed by determining the dispersion characteristic (also referred as the "dispersion curve") of the interface waves and using the dispersion characteristic to extrapolate the interface waves using an interface wave propagation model. As will be appreciated, in horizontally layered media, Rayleigh waves travel along the air/solid interface, and Scholte waves travel along the water/solid interface. Both of these interface waves exhibit exponential decay in the depth direction. An example approach is describes supra. However, in other embodiments, other techniques for estimating the dispersion curve in the frequency band of the interface waves may be used.

The dispersion characteristic of dominant surface waves may be estimated from a dispersion analysis of the interface from the actual seismic record to obtain its frequency dependent velocity variation $v(\omega)$. Using the frequency dependent velocity variation $v(\omega)$, a second seismic trace at $X+\Delta x$ may be extrapolated using the following equation:

$$T(X+\Delta x, \omega) \approx T(X, \omega) * e^{-i\frac{\omega}{v(\omega)}*\Delta x} \quad (3)$$

where T is the seismic trace at a location and frequency ($\omega$).

This interpolation performed on a shot or receiver gather is driven by the frequency dependent surface wave velocity and thus will primarily affect surface wave arrivals. For a small $\Delta x$, the time shift of the reflection arrival will be relatively small. Here again, the interpolated seismic trace is assumed to occupy the same spatial location as the recorded seismic trace.

Figure 7:
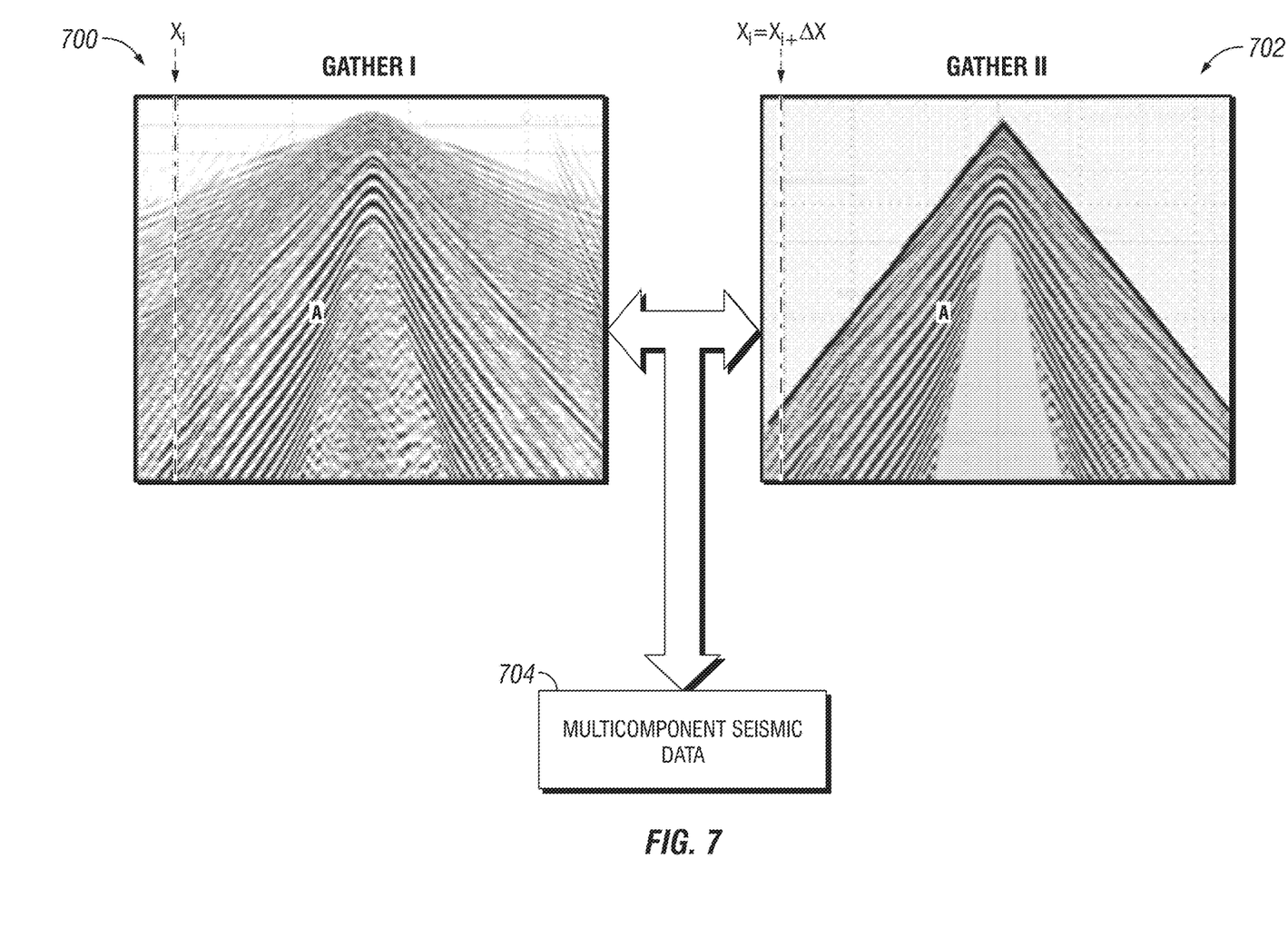
FIG. 7 is a schematic diagram of example seismic receiver gathers of recorded single component data and generated second component seismic data to produce multicomponent seismic data in accordance with an embodiment of the disclosure.

Next, polarization filtering may be applied to multicomponent seismic data formed from the single component seismic trace (that is, the recorded seismic trace) and the interpolated seismic trace (block 208). FIG. 7 depicts the formation of multicomponent seismic data from an example single component seismic trace 700 at location $x_i$ and the interpolated seismic trace 702 at new spatial location $x_i+\Delta x$ in accordance with an embodiment of the disclosure. The combination of the two seismic traces (also referred to as "gathers") may produce multicomponent seismic data 704 that may be used for the application of polarization filtering.

After polarization filtering, seismic data may be produced with attenuated noise from various sources. The attenuated seismic data may be used to generate a seismic image of a region of interest (for example, a subsurface rock formation).

Figure 8:
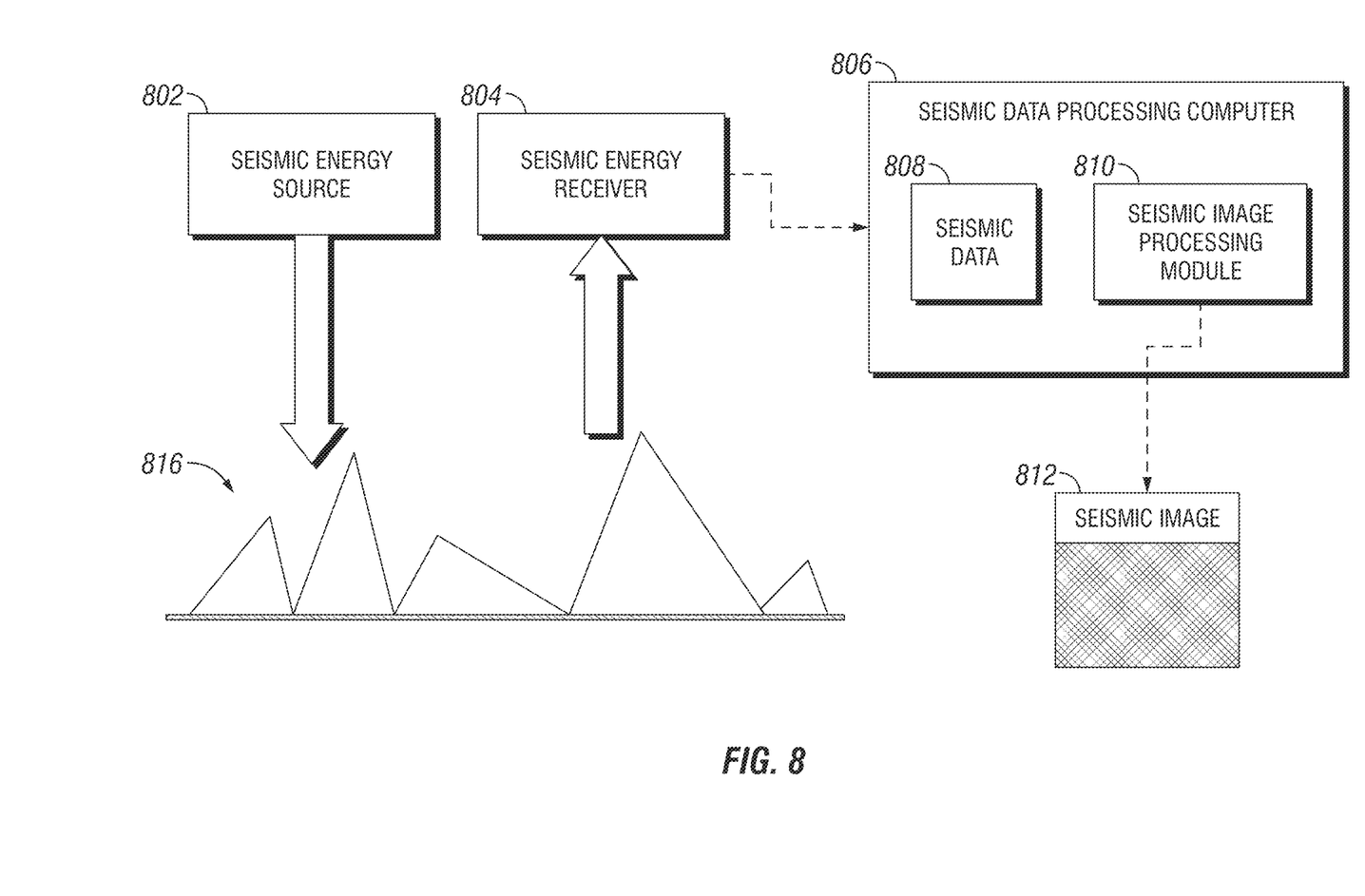
FIG. 8 is a block diagram of a system for producing single component seismic data and attenuating interface waves using polarization filtering applied to single component seismic data in accordance with an embodiment of the disclosure.

FIG. 8 depicts a system 800 for producing single component seismic data and attenuating interface waves using polarization filtering applied to single component seismic data in accordance with an embodiment of the disclosure. The system 800 can include, for example, a seismic source 802 (also referred to as a "seismic station"), a single component seismic receiver 804 (also referred to as a "receiver station"), a seismic data processing computer 806 that stores and processes single component seismic data 808, such as a shot gather responsive to seismic energy signals received by the seismic receiver, and seismic image processing module 810 that produces a seismic image 812 from seismic data. According to various embodiments of the present disclosure, the seismic source 802 can include any seismic or acoustic energy whether from an explosive, implosive, swept-frequency or random sources. The seismic source, for example, can generate a seismic energy signal that propagates into the earth 816.

Generally, the seismic source 802 can emit seismic waves into the earth 816 to evaluate subsurface conditions and to detect possible concentrations of oil, gas, and other subsurface minerals. Seismic waves may travel through an elastic body (such as the earth 816). The propagation velocity of seismic waves can depends on the particular elastic medium through which the waves travel, particularly the density and elasticity of the medium as is known and understood by those skilled in the art. The refraction or reflection of seismic waves onto a seismic receiver 804 can be used to research and investigate subsurface structures of the earth 816.

Accordingly, the seismic receiver 804 can be positioned to receive and record seismic energy data or seismic field records in any form including, but not limited to, a geophysical time series recording of the acoustic reflection and refraction of waveforms that travel from the seismic source 802 to the seismic receiver 804. Variations in the travel times of reflection and refraction events in one or more field records in seismic data processing can produce seismic data 808 that demonstrates subsurface structures according to the techniques described herein. Seismic images produced from the seismic image data may be used to aid in the search for, and exploitation of, subsurface mineral deposits in the geological structure.

Generally speaking, seismic receivers 804 can record sound wave echoes (otherwise known as seismic energy signal reflections) that come back up through the ground from a seismic source 802 to a recording surface. Such seismic receivers 804 can record the intensity of such sound waves and the time it took for the sound wave to travel from the seismic source 802 back to the seismic receiver 804 at the recording surface. According to various exemplary embodiments of the present disclosure, for example, during the seismic imaging process, the reflections of sound waves emitted by a seismic source 802, and recorded by a seismic energy recording 804, can be processed by a computer to generate a seismic image, of the subsurface. The seismic image of the subsurface can be used to identify, for example, the placement of wells and potential well flow paths.

More specifically, the term seismic receiver 804 as is known and understood by those skilled in the art, can include geophones, hydrophones and other sensors designed to receive and record seismic energy. Accordingly, by placing a plurality of geophone seismic receivers 804 at a recording surface, a two-dimensional seismic image can be produced responsive to seismic data recorded by the geophone seismic receivers 804. Embodiments of the system 800 may include a plurality of single component seismic receivers having a designated spacing between each receiver 804. The single component seismic receiver may record a single component of seismic wavefield, such as the P-wave component). Advantageously, embodiments of the disclosure enable the use of single component seismic data that may be produced by receivers 804 having a relatively greater spacing between each receiver, as opposed to the recording of multicomponent seismic data that requires a relatively smaller spacing between receivers.

According to an embodiment of the present disclosure, a seismic receiver 804 can be positioned to receive and record seismic energy data or seismic field records in any form including a geophysical time series recording of the acoustic reflection and refraction of waveforms that travel from the seismic source 802 to the seismic receiver 804. Variations in the travel times of reflection and refraction events in one or more field records in a plurality of seismic signals can, when processed by the seismic data processing computer 806, produce seismic data 808 that demonstrates subsurface structures. As described herein, prior to using a seismic data 808 to aid in the search for, and exploitation of, mineral deposits, the seismic data 808 may be processed to enable the application of polarization filtering to the single component seismic data. The interpretation of the seismic image 812 generated from such data may be used to determine the location of wells drilling into the earth 816. Thus, one or more drills may be drilled into the earth 816 in response to the generation and interpretation of the seismic image 812.

Figure 9:
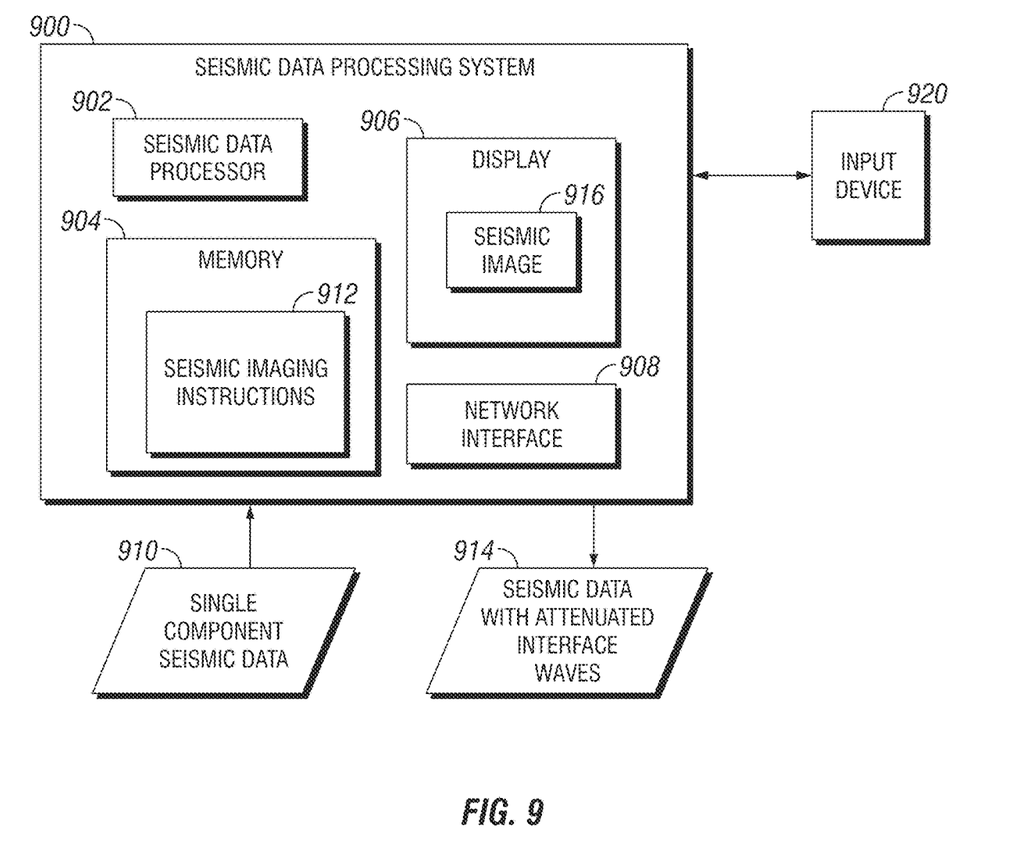
FIG. 9 a block diagram of a seismic data processing system in accordance with an embodiment of the disclosure.

FIG. 9 depicts components of a seismic data processing computer 900 in accordance with an embodiment of the disclosure. In some embodiments, seismic data processing computer 900 may be in communication with other components of a system for obtaining and producing seismic data. Such other components may include, for example, seismic shot stations (sources) and seismic receiving stations (receivers). As shown in FIG. 9, the seismic data processing computer 900 may include a seismic data processor 902, a memory 904, a display 906, and a network interface 908. It should be appreciated that the seismic data processing computer 900 may include other components that are omitted for clarity. In some embodiments, seismic data processing computer 900 may include or be a part of a computer cluster, cloud-computing system, a data center, a server rack or other server enclosure, a server, a virtual server, a desktop computer, a laptop computer, a tablet computer, or the like.

The seismic data processor 902 (as used the disclosure, the term "processor" encompasses microprocessors) may include one or more processors having the capability to receive and process seismic data, such as data received from seismic receiving stations. In some embodiments, the seismic data processor 902 may include an application-specific integrated circuit (AISC). In some embodiments, the seismic data processor 902 may include a reduced instruction set (RISC) processor. Additionally, the seismic data processor 902 may include a single-core processors and multicore processors and may include graphics processors. Multiple processors may be employed to provide for parallel or sequential execution of one or more of the techniques described in the disclosure. The seismic data processor 902 may receive instructions and data from a memory (for example, memory 904).

The memory 904 (which may include one or more tangible non-transitory computer readable storage mediums) may include volatile memory, such as random access memory (RAM), and non-volatile memory, such as ROM, flash memory, a hard drive, any other suitable optical, magnetic, or solid-state storage medium, or a combination thereof. The memory 904 may be accessible by the seismic data processor 902. The memory 904 may store executable computer code. The executable computer code may include computer program instructions for implementing one or more techniques described in the disclosure. For example, the executable computer code may include seismic imaging instructions 912 that define a seismic image processing module to implement embodiments of the present disclosure. In some embodiments, the seismic imaging instructions 912 may implement one or more elements of process 200 described above and illustrated in FIG. 2. In some embodiments, the seismic imaging instructions 912 may receive, as input, single component seismic data 910 and may produce, as output a seismic data with attenuated interface waves 914. In some embodiments, a seismic image 916 may be produced, stored in the memory 904 and, as shown in FIG. 9, displayed on the display 906.

The display 906 may include a cathode ray tube (CRT) display, liquid crystal display (LCD), an organic light emitting diode (OLED) display, or other suitable display. The display 906 may display a user interface (for example, a graphical user interface) that may display information received from the plant information processing computer 906. In accordance with some embodiments, the display 906 may be a touch screen and may include or be provided with touch sensitive elements through which a user may interact with the user interface. The display 906 may display the seismic image 916 produced using the seismic imaging instructions 912 in accordance with the techniques described herein. For example, the seismic image 916 may be produced from single component seismic data after the application of polarization filtering and attenuation of interface wave noise, as described in the disclosure.

The network interface 908 may provide for communication between the seismic data processing computer 900 and other devices. The network interface 908 may include a wired network interface card (NIC), a wireless (e.g., radio frequency) network interface card, or combination thereof. The network interface 908 may include circuitry for receiving and sending signals to and from communications networks, such as an antenna system, an RF transceiver, an amplifier, a tuner, an oscillator, a digital signal processor, and so forth. The network interface 908 may communicate with networks, such as the Internet, an intranet, a wide area network (WAN), a local area network (LAN), a metropolitan area network (MAN) or other networks. Communication over networks may use suitable standards, protocols, and technologies, such as Ethernet Bluetooth, Wireless Fidelity (Wi-Fi) (e.g., IEEE 802.11 standards), and other standards, protocols, and technologies. In some embodiments, for example, the unprocessed seismic data 9010 may be received over a network via the network interface 908. In some embodiments, for example, the seismic image 916 may be provided to other devices over the network via the network interface 908.

In some embodiments, seismic data processing computer may be coupled to an input device 920 (for example, one or more input devices). The input devices 920 may include, for example, a keyboard, a mouse, a microphone, or other input devices. In some embodiments, the input device 920 may enable interaction with a user interface displayed on the display 906. For example, in some embodiments, the input devices 920 may enable the entry of inputs that control the acquisition of seismic data, the processing of seismic data, and so on.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A computer-implemented method for producing attenuated seismic data from single component seismic data generated from a seismic receiver station configured to sense seismic signals originating from a seismic source station, the method comprising:
   obtaining single component seismic data from the seismic receiver station at a first location;
   filtering the single component seismic data to identify interface waves in the single component seismic data;
   generating, using the identified interface waves, second component seismic data at a second location;
   applying polarization filtering to multicomponent data comprising the single component seismic data and the second component seismic data; and
   producing attenuated seismic data from the application of polarization filtering, the attenuated seismic data having attenuated interface waves as compared to the single component seismic data.

2. The method of claim 1, comprising generating a seismic image from the attenuated seismic data.

3. The method of claim 1, wherein the filtering is performed within a velocity constraint defined by a first velocity and a second velocity.

4. The method of claim 1, wherein generating, using the identified interface waves, second component seismic data at a second location, comprising using a differential normal moveout (NMO) interpolation applied to common midpoint (CMP) gathers of the identified interface waves.

5. The method of claim 1, wherein generating, using the identified interface wave noise, second component seismic data at a second location, comprises:
   determining a dispersion curve using the identified interface waves; and
   generating a second component seismic data at the second location using the frequency dependent velocity variation, the frequency dependent velocity variation determined from the dispersion curve.

6. The method of claim 1, wherein the seismic receiver station comprises a geophone.

7. The method of claim 1, wherein the second location is determined by adding a distance to the first location.

8. A non-transitory computer-readable storage medium having executable code stored thereon for producing attenuated seismic data from single component seismic data generated from a seismic receiver station configured to sense seismic signals originating from a seismic source station, the executable code comprising a set of instructions that causes a processor to perform operations comprising:
   obtaining single component seismic data from the seismic receiver station at a first location;
   filtering the single component seismic data to identify interface waves in the single component seismic data;
   generating, using the identified interface waves, second component seismic data at a second location;
   applying polarization filtering to multicomponent data comprising the single component seismic data and the second component seismic data; and
   producing attenuated seismic data from the application of polarization filtering, the attenuated seismic data having attenuated interface waves as compared to the single component seismic data.

9. The non-transitory computer-readable storage medium of claim 8, the operations comprising generating a seismic image from the attenuated seismic data.

10. The non-transitory computer-readable storage medium of claim 8, wherein the filtering is performed within a velocity constraint defined by a first velocity and a second velocity.

11. The non-transitory computer-readable storage medium of claim 8, wherein generating, using the identified interface waves, second component seismic data at a second location, comprising using a differential normal moveout (NMO) interpolation applied to common midpoint (CMP) gathers of the identified interface waves.

12. The non-transitory computer-readable storage medium of claim 8, wherein generating, using the identified interface waves, second component seismic data at a second location, comprises:
   determining a dispersion curve using the identified interface waves;
   generating a second component seismic data at the second location using the frequency dependent velocity variation, the frequency dependent velocity variation determined from the dispersion curve.

13. The non-transitory computer-readable storage medium of claim 8, wherein the seismic receiver station comprises a geophone.

14. The non-transitory computer-readable storage medium of claim 8, wherein the second location is determined by adding a distance to the first location.

15. A system, comprising:
   a seismic source station;
   a seismic receiver station configured to sense seismic signals originating from a seismic source station;
   a seismic data processor;
   non-transitory computer-readable storage memory accessible by the seismic data processor and having executable code stored thereon for producing attenuated seismic data from seismic data generated from the seismic receiver station, the executable code comprising a set of instructions that causes the seismic data processor to perform operations comprising:
      obtaining single component seismic data from the seismic receiver station at a first location;
      filtering the single component seismic data to identify interface waves in the single component seismic data;
      generating, using the identified interface waves, second component seismic data at a second location;
      applying polarization filtering to multicomponent data comprising the single component seismic data and the second component seismic data; and
      producing attenuated seismic data from the application of polarization filtering, the attenuated seismic data having attenuated interface waves as compared to the single component seismic data.

16. The system of claim 15, the operations comprising generating a seismic image from the attenuated seismic data.

17. The system of claim 15, wherein the filtering is performed within a velocity constraint defined by a first velocity and a second velocity.

18. The system of claim 15, wherein generating, using the identified interface waves, second component seismic data at a second location, comprising using a differential normal moveout (NMO) interpolation applied to common midpoint (CMP) gathers of the identified interface waves.

19. The system of claim 15, wherein generating, using the identified interface waves, second component seismic data at a second location, comprises:
   determining a dispersion curve using the identified interface waves;
      generating a second component seismic data at the second location using the frequency dependent velocity variation, the frequency dependent velocity variation determined from the dispersion curve.

20. The system of claim 15, wherein the seismic receiver station comprises a geophone.

\* \* \* \* \*